US012602521B2

(12) United States Patent
Welscher

(10) Patent No.: US 12,602,521 B2
(45) Date of Patent: Apr. 14, 2026

(54) COMPUTER-IMPLEMENTED METHOD, DATA PROCESSING SYSTEM FOR PRODUCING A TARGET DESIGN AND COMPUTER PROGRAM, STORAGE MEDIUM HAVING INSTRUCTIONS FOR PRODUCING A TARGET DESIGN, METHOD FOR PROVIDING A SPECTACLE LENS, STORAGE MEDIUM HAVING A NUMERICAL REPRESENTATION OF A SPECTACLE LENS AND METHOD FOR MANUFACTURING A SPECTACLE LENS

(71) Applicant: Carl Zeiss Vision International GmbH, Aalen (DE)

(72) Inventor: Markus Welscher, Rainau (DE)

(73) Assignee: Carl Zeiss Vision International GmbH, Aalen (DE)

( * ) Notice: Subject to any disclaimer, the term of this patent is extended or adjusted under 35 U.S.C. 154(b) by 1279 days.

(21) Appl. No.: 17/133,790

(22) Filed: Dec. 24, 2020

(65) Prior Publication Data

US 2021/0117588 A1     Apr. 22, 2021

Related U.S. Application Data

(63) Continuation of application No. PCT/EP2019/066879, filed on Jun. 25, 2019.

(30) Foreign Application Priority Data

Jun. 27, 2018     (DE) ..................... 10 2018 115 412.7

(51) Int. Cl.
*G06F 30/17* (2020.01)
*G06F 30/12* (2020.01)
(Continued)

(52) U.S. Cl.
CPC .............. *G06F 30/17* (2020.01); *G06F 30/12* (2020.01); *G06F 30/20* (2020.01); *G06F 2111/10* (2020.01)

(58) Field of Classification Search
CPC .......... G06F 30/17; G06F 30/12; G06F 30/20; G06F 2111/10
See application file for complete search history.

(56) References Cited

U.S. PATENT DOCUMENTS

| 5,042,936 A | 8/1991 | Guenther et al. |
| 6,382,789 B1 * | 5/2002 | Baudart ................. G02C 7/025 |
| | | 351/159.75 |

(Continued)

FOREIGN PATENT DOCUMENTS

| CN | 101075021 A | 11/2007 |
| CN | 102129132 A | 7/2011 |

(Continued)

OTHER PUBLICATIONS

Office action by the Chinese Patent Office issued in CN201980056453.7, which is a counterpart hereof, mailed Sep. 21, 2022, and English-language translation thereof.

(Continued)

*Primary Examiner* — Bijan Mapar
(74) *Attorney, Agent, or Firm* — Qubit IP, PLLC

(57) ABSTRACT

A target design is produced with a computer-implemented method that takes into consideration an astigmatic effect and is suitable for optimizing a spectacle lens having the astigmatic effect. The method includes providing an initial target design that does not directly take into consideration the astigmatic effect of the spectacle lens, and producing the target design by correcting the initial target design on the basis of a correction target design that directly takes into consideration the astigmatic effect of the spectacle lens.

27 Claims, 2 Drawing Sheets

1 – Data processing system
3, 17 – Interface
5 – Calculation Unit
7, 9, 11 – Ascertainment Unit
8, 10, 12 – Memory
13 – Differentiating Unit
15 – Adding Unit

(51) Int. Cl.
    *G06F 30/20*         (2020.01)
    *G06F 111/10*      (2020.01)

(56)             References Cited

U.S. PATENT DOCUMENTS

| | | | |
|---|---|---|---|
| 8,757,800 B2 | 6/2014 | Esser et al. | |
| 9,910,294 B2 | 3/2018 | Altheimer et al. | |
| 10,739,617 B2 * | 8/2020 | Jubin | G02C 7/047 |
| 2007/0242221 A1 | 10/2007 | Guilloux et al. | |
| 2011/0051082 A1 * | 3/2011 | Becken | G02C 7/024 |
| | | | 351/159.76 |
| 2012/0156397 A1 * | 6/2012 | Jethmalani | B29D 11/00413 |
| | | | 427/595 |
| 2012/0188504 A1 | 7/2012 | Petignaud et al. | |
| 2013/0265540 A1 | 10/2013 | Esser et al. | |
| 2017/0363883 A1 | 12/2017 | Fricker et al. | |
| 2018/0042474 A1 | 2/2018 | Marcos et al. | |

FOREIGN PATENT DOCUMENTS

| | | | |
|---|---|---|---|
| CN | 102439511 A | 5/2012 | |
| CN | 105445956 A | 3/2016 | |
| CN | 107003540 A | 8/2017 | |
| CN | 107407825 A | 11/2017 | |
| DE | 102012000390 A1 | 7/2013 | |
| JP | 2005201971 A | 7/2005 | |
| WO | B904986 A1 | 6/1989 | |
| WO | 2008089999 A1 | 7/2008 | |

OTHER PUBLICATIONS

Translation of the International Preliminary Examination Report issued in PCT/EP2019/066879, to which this application claims priority, mailed Nov. 2, 2020.

Office action by the Chinese Patent Office issued in CN201980056453. 7, which is a counterpart hereof, mailed Apr. 12, 2022, and English-language translation thereof.

"Ophthalmic optics—Spectacle lenses—Vocabulary (ISO 13666:2012)," German and English version EN ISO 13666:2012, Oct. 2013.

"Ophthalmic optics—Terms and definitions related to free-form technology," German and English version DIN SPEC 58194, Dec. 2015.

Brooks: "Lens Design," System for Ophthalmic Dispensing, Chapter 18, pp. 402 to 430, Elsevier, Jan. 1, 2007.

Meister: "Personalized Lenses by ZEISS Zeiss Individual Progressive Lenses: The Optics of Truly Customized Progressive Lenses," Sep. 27, 2009.

Meister et al.: "Introduction to Ophthalmic Optics," Carl Zeiss Vision, Jun. 3, 2010.

International Search Report issued in PCT/EP2019/066879, to which this application claims priority, mailed Oct. 25, 2019, and English-language translation thereof.

Written Opinion issued in PCT/EP2019/066879, to which this application claims priority, mailed Jun. 9, 2020.

International Preliminary Examination Report issued in PCT/EP2019/ 066879, to which this application claims priority, mailed Nov. 2, 2020.

Office Action by the German Patent and Trademark Office (GPTO) issued in DE 10 2018 115 412.7, which is a counterpart hereof, mailed on Mar. 6, 2023, and English translation thereof.

Office action by the European Patent Office issued in EP 19734058. 1, which is a counterpart hereof, mailed Mar. 7, 2022, and English-language machine translation thereof.

* cited by examiner

1 – Data processing system
3, 17 – Interface
5 – Calculation Unit
7, 9, 11 – Ascertainment Unit
8, 10, 12 – Memory
13 – Differentiating Unit
15 – Adding Unit

COMPUTER-IMPLEMENTED METHOD, DATA PROCESSING SYSTEM FOR PRODUCING A TARGET DESIGN AND COMPUTER PROGRAM, STORAGE MEDIUM HAVING INSTRUCTIONS FOR PRODUCING A TARGET DESIGN, METHOD FOR PROVIDING A SPECTACLE LENS, STORAGE MEDIUM HAVING A NUMERICAL REPRESENTATION OF A SPECTACLE LENS AND METHOD FOR MANUFACTURING A SPECTACLE LENS

CROSS REFERENCE TO RELATED APPLICATIONS

This application is a continuation application of international patent application PCT/EP2019/066879, filed Jun. 25, 2019, designating the United States and claiming priority from German patent application 10 2018 115 412.7, filed Jun. 27, 2018, and the entire content of both applications is incorporated herein by reference.

TECHNICAL FIELD

The present disclosure relates to a computer-implemented method and a data processing system for generating a target design suitable for use when optimizing a spectacle lens. Additionally, the disclosure relates to a computer program and a non-volatile computer-readable storage medium with instructions for generating such a target design. Furthermore, the disclosure relates to a method for providing a spectacle lens, a storage medium with a numerical representation of a spectacle lens and a method for producing a spectacle lens.

BACKGROUND

Spectacle lenses can be divided into those with only dioptric power, so-called single-vision lenses pursuant to DIN ISO 13666:2013-10, section 8.3.1, and those with different focusing powers, so-called multifocal lenses pursuant to DIN ISO 13666:2013-10, section 8.3.2. The term "dioptric power" forms a collective term for the focusing power and prismatic power of the spectacle lens; the term "focusing power" in turn forms a collective term for the spherical power, according to which a paraxial pencil of parallel light is focused at a point (DIN ISO 13666:2013-10, section 11.1) and which is usually considered in a prescription by a "sphere" value, and the astigmatic power of the spectacle lens, according to which a paraxial pencil of parallel light is focused in two separate line foci mutually at right angles (DIN ISO 13666:2013-10, section 12.1) and which is usually considered in a prescription by a "cylinder" value. Within the scope of the present description, a pencil of light is to be considered to be a paraxial pencil of light if its diameter does not exceed 0.05 mm, in particular 0.01 mm. Pursuant to DIN ISO 13666:2013-10, section 11.2, the value "sphere" denotes the value of the back vertex power of a spherical-power lens or the vertex power in one of the two principal meridians of an astigmatic-power lens. Here, a principal meridian (DIN ISO 13666:2013-10, section 7.4) is that meridian plane of a surface which shows the maximum or minimum curvature on measurement of the surface, with the term "meridian plane" (DIN ISO 13666:2013-10, section 5.7.1) denoting a plane containing the center(s) of curvature of a surface. A principal meridian of a spectacle lens with astigmatic power is understood to mean, pursuant to DIN ISO 13666:2013-10, section 12.2, in particular, one of two mutually perpendicular meridian planes which are parallel to the two line foci. Here, the "cylinder" value (DIN ISO 13666:2013-10, section 12.5) denotes the astigmatic difference which, pursuant to DIN ISO 13666:2013-10, section 12.4, is the difference between the vertex power in the first principal meridian and the vertex power in the second principal meridian of a spectacle lens with astigmatic power, in relation to the first or the second principal meridian. The direction of the principal meridian used as reference is characterized by the "axis" angle (DIN ISO 13666:2013-10, section 12.6). Pursuant to DIN ISO 13666:2013-10, section 12.2.1, the first principal meridian is the principal meridian with the lower refractive power in this case; the second principal meridian (DIN ISO 13666:2013-10, section 12.2.2) is the principal meridian with the higher refractive power.

The use of a plurality of focusing powers facilitates a correction of visual defects in both the near and distance portion for the wearer of the spectacles using a single spectacle lens. If the power transition between the distance portion and the near portion is continuous, reference is made to progressive addition lenses, as defined in DIN ISO 13666:2013-10, section 8.3.5. A progressive addition lens is a spectacle lens with at least one progressive surface and an increasing (positive) power when the spectacle wearer looks downward. Pursuant to section 7.7 of standard DIN ISO 13666:2013-10, a progressive surface defines a surface, which is non-rotationally symmetrical, with a continuous change of curvature over part or all of the surface, generally intended to provide increasing addition or degression power.

These days, progressive addition lenses can be adapted individually to a patient's eye on the basis of the measured refraction of the measured eye. To this end, at least one of the spectacle lens surfaces, frequently the back surface or eye-side surface which faces the eye when the spectacles are used as intended (DIN ISO 13666:2013-10, section 5.9), is provided with a free-form surface. Here, a free-form surface represents a surface which is able to be formed freely during production and, in particular, which need not have axial symmetry or rotational symmetry and which generates different powers (spherical and/or astigmatic and/or prismatic) in different regions of the spectacle lens. In a broader sense, a free-form surface is understood to mean a complex surface that can be represented, in particular, using piecewise functions, in particular twice continuously differentiable piecewise functions. Examples of suitable piecewise functions are (in particular piecewise) polynomial functions (in particular polynomial splines such as bicubic splines, higher order splines of fourth order or higher, Zernike polynomials, Forbes surfaces, Chebyshev polynomials, or polynomial non-uniform rational B-splines (NURBS)) or Fourier series. These should be distinguished from simple surfaces such as, for example, spherical surfaces, aspherical surfaces, cylindrical surfaces, toroidal surfaces, atoroidal surfaces or else the surfaces described on page 12, lines 6 to 13 of WO 89/04986 A1, which are described as circles, at least along a principal meridian. A free-form surface in the narrower sense, corresponding to section 2.1.2 of the DIN SPEC 58194, dated December 2015, is a spectacle lens surface manufactured using free-form technology, which is described mathematically within the limits of differential geometry and which is neither point symmetric nor axially symmetric.

As a rule, free-form surfaces are produced on a spectacle lens by machining the spectacle lens, i.e., for example, by milling, or within the scope of a CNC method, by virtue of the free-form surface being produced under numerical control on the basis of a mathematical description of the surface. The mathematical description of the free-form surface is typically implemented with the aid of piecewise functions. In this case, a piecewise function is a function which is defined between grid points of a generally planar two-dimensional grid, for example on a rectangular area of a rectangular grid, and which defines a portion of the free-form surface. By way of example, if the rectangular grid lies in the xy-plane of a Cartesian coordinate system, the piecewise functions can be functions of the x-coordinate and the y-coordinate. Their function values then form the z-coordinate assigned to a point in the xy-plane and the set of all z-coordinates of a piecewise function forms a portion of the free-form surface. In the simplest case, the points of the free-form surface are specified at each location of the xy-plane by the z-coordinate. Expressed differently, the functional values of the piecewise functions specify the respective height of a point of the free-form surface above a point in the xy-plane. As a rule, the piecewise functions are determined in such a way that the transitions to the piecewise functions defined on the adjacent grid areas are continuous at least in the first derivative, preferably also in the second derivative. If the piecewise functions are polynomials, these are referred to as splines.

Determining the mathematical model of the free-form surface is implemented by an optimization method, in which an optical target design to be achieved or a surface target design to be achieved is specified. An optical target design is a distribution or a prescription of image aberrations over the entire spectacle lens or else, therebeyond, in the spectacle wearer beam path (e.g., astigmatic residual deviation, spherical residual deviation, prism, horizontal symmetry, distortion, or else higher order aberrations such as, e.g., coma). Additionally, the optical target design may contain prescriptions for the astigmatic and spherical residual deviations at reference points (e.g., distance design reference point or near design reference point) or the addition power in the measurement beam path of a measuring device (e.g., a vertex power measuring device). The optical target design specifies, for example, the distribution of the values to be obtained with a spectacle lens for the admissible spherical residual aberrations of the spectacle lens and for the admissible astigmatic residual aberrations in the so-called spectacle wearer beam path, i.e., in a beam path that passes through the pupil of the eye or the fulcrum of the eye. Typically, these residual aberrations in the form of individual values are defined at a multiplicity of points on the front surface of the spectacle lens (i.e., on the side of the spectacle lens facing away from the eye), the so-called optimization points. The spherical residual aberration should be understood to mean the deviation of the spherical correction caused by the spectacle lens from the spherical correction according to the prescription; the astigmatic residual aberration should be understood to mean the deviation of the astigmatic correction caused by the spectacle lens from the astigmatic correction according to the prescription. Within the scope of a ray calculation for calculating the distribution of the values for the spherical and the astigmatic residual aberration over the entire spectacle lens, use is made of pencils of light of which respectively one ray, referred to as a chief ray below, extends not only through the spectacle lens but also through the fulcrum of the eye, with the chief rays passing through the front spectacle lens surface at the optimization points. As a rule, the use conditions of the respective spectacle lens are considered in this case and the free-form surfaces optimized for the respective use conditions. By way of example, the use conditions can be specified by the "as-worn" pantoscopic angle (DIN ISO 13666: 2013-10, section 5.18), the face form angle (DIN ISO 13666:2013-10, section 17.3) and the vertex distance (DIN ISO 13666:2013-10, section 5.27) and are fitted to the respective wearer for each spectacle lens. Here, the term "as-worn" pantoscopic angle denotes an angle in the vertical plane between the normal to the front surface of a spectacle lens at its boxed center (the box system is a system of measures and definitions based on a rectangle formed by the horizontal and vertical tangents at the outer edges of the spectacle lens or the spectacle lens blank) and the line of sight of the eye in the primary position, usually taken to be the horizontal (main fixation direction). The term "face form angle" should be understood to mean the angle between the plane of the spectacle front and the plane of the right lens shape, or of the left lens shape, wherein the term "plane of the lens shape" describes a plane tangential to the front surface of a demonstration or dummy shape worked in the spectacle frame at the geometric shape center thereof (a demonstration shape or dummy shape is the spectacle lens without dioptric power inserted into the spectacle frame by the manufacturer for demonstration purposes) and the term "plane of the spectacle front" describes a plane through the two vertical centerlines of the right and left plane of the lens shape (in the case where the two centerlines are not parallel to one another, this applies approximately). The term "vertex distance" denotes the distance between the back surface of the spectacle lens and the apex of the cornea measured in the viewing direction perpendicular to the plane of the spectacle front.

In addition to the "as-worn" pantoscopic angle, the face form angle and the vertex distance, the use conditions, as a rule, also include the interpupillary distance (DIN ISO 13666:2013-10, section 5.29), i.e., the distance between the centers of the pupils when the eyes are fixating an object at an infinite distance in the straight-ahead position, and the centration data, i.e., the dimensions and distances required to center the spectacle lens in front of the eye, and the object distance model, which sets the object distance for which a certain point on the spectacle lens surface is optimized. The optical target design is usually defined in relation to the front spectacle lens surface since, as a rule, in the case of spectacle lenses, the distance and near design reference points are also defined on the front surface, wherein the distance and near design reference points pursuant to DIN ISO 13666:2013-10, sections 5.13 and 5.14 are those points, stipulated by the manufacturer, on the front surface of a finished lens or on the finished surface of a lens, at which the design specifications for the distance portion and near portion, respectively, apply.

An alternative option to the optical target design for specifying a target design consists of specifying surface properties of the free-form surface in the target design, for example a surface refractive power and a surface astigmatism at the respective optimization points, which in this case are located on the surface which should be formed into the free-form surface. Here, the surface refractive power is a measure for the ability of a surface section surrounding an optimization point to change the vergence (refractive index of the spectacle lens material divided by the radius of curvature of the wavefront) of a pencil of light incident on the surface section from the air. The surface astigmatism at an optimization point represents the difference of the surface refractive powers in the principal meridians at an optimization point of the surface. Here, the principal meridians at the optimization point are the meridian planes of the surface section surrounding the optimization point with maximum and minimum curvature, wherein the meridian planes are planes which contain the center of curvature of the surface section surrounding the optimization point and the normal vector of the surface section at the optimization point. Below, the term "target design" should comprise both the area target design and the optical target design.

An initial spectacle lens, for example a simple single-vision lens, is specified within the scope of the optimization method. Pursuant to DIN ISO 13666:2013-10, section 8.3.1, a single-vision lens is a lens in which only dioptric power is present due to the construction. The geometry of the initial spectacle lens emerges from the refraction data of the spectacle wearer and typically contains a spherical or toroidal back surface, which is replaced by an approximating surface for the optimization, the approximating surface being defined by the piecewise functions. For this initial spectacle lens, the arising values for, e.g., the spherical residual error and the astigmatic residual error at the respective optimization points are calculated by means of ray calculation and compared to the values prescribed by the optical target design. Here, the ray calculation performed calculates the values at the individual optimization points, in each case for a pencil of light whose chief ray extends through the optimization point on the spectacle lens front side and through the fulcrum of the eye, i.e., the point about which the eye rotates in the case of viewing movements. From the deviation between, for example, firstly, the specified values for the spherical residual aberration and the astigmatic residual aberration and, secondly, the calculated values, it is possible to ascertain an error function or a global error, the value or values of which depend on the form of the piecewise functions or on the parameters thereof. This error function or this global error can be minimized by an optimization method, in which the piecewise functions, i.e., their parameters, are altered in such a way that the error function finally satisfies a termination condition. By way of example, the termination condition may be satisfied by reaching a minimum or dropping below a predetermined limit value by the value of the error function. The optimized piecewise functions finally represent the free-form surface. The computer-controlled processing of the back spectacle lens surface is implemented on the basis of this free-form surface. In addition or as an alternative to the back surfaces, the optimization methods can accordingly be used to also optimize the front surface (pursuant to DIN ISO 13666: 2013-10, section 5.8, the surface of a spectacle lens which faces away from the eye when the spectacles are used as intended). Instead of an optical target design basis, the optimization can also be implemented on the basis of a surface target design, wherein the optimization method is then adapted to the use of the surface target design.

The target of such an individual optimization is to supply all wearers of spectacle lenses of a spectacle lens family with the same visual impression, independently of the values of the refraction data and independently of the use conditions. That is to say, the target of an individual optimization is that of, for example, realizing the same optical design for all lenses of a spectacle lens family. Here, a spectacle lens family should be understood to mean a set of progressive addition lenses with the same power increase, i.e., the same progression length and the same difference between the power in the near vision zone (near portion) and the power in the distance vision zone (distance portion). The progression length denotes a length which defines an extent of the progression zone or intermediate corridor in the direction of the power increase. Pursuant to section 14.2.14 of DIN EN ISO 13666:2013-10, the progression zone is the zone covering the transition between the distance and near portions of a progressive addition lens, or the near and intermediate portions of a degressive power lens. Pursuant to section 14.1.25 of DIN EN ISO 13666:2013-10, the intermediate corridor is the portion of a progressive addition lens providing clear vision for ranges intermediate between distance and near. By way of example, the vertical distance in the central field of vision from the point on the spectacle lens front surface at which the power increase starts, to the point on the front surface at which the required power increase for the near vision is achieved for the first time, can be used as a progression length. Alternatively, it is also possible, for example, to use the length of a curved line which extends in the center of the progression zone between a point in the near portion and a point in the far portion, e.g., the near reference point and the distance reference point.

By way of example, optimization methods for spectacle lenses are described in DE 10 2012 000 390 A1 and in WO 2008/089999 A1.

Creating a target design for a spectacle lens which should have astigmatic power is difficult if the target design should consider a specified direction. In a multifocal lens such as a progressive addition lens in particular, the orientation of the spectacle lens during its use is set by the arrangement of the near portion relative to the distance portion. This setting requires the creation of a target design while considering a specified direction. Likewise, the use conditions of a spectacle lens can set its orientation during use. Considering use conditions in the target design may therefore also make considering a specified direction in the target design necessary. On account of the specified direction, there are various options of orienting the axis of the cylindrical power in relation to the specified direction, and so a very large number of target designs are required on account of the large number of possible orientations of the axis in relation to the specified direction. Therefore, creating a very large number of target designs that represent different astigmatic powers would require a great amount of outlay.

U.S. Pat. No. 6,382,789 B1 has disclosed an optimization method for spectacle lenses, in which a spherical target design is used to optimize a spectacle lens with astigmatic power. During the optimization, a residual astigmatism which specifies the difference of the astigmatic power obtained by the lens to be generated from the astigmatic power according to the prescription is minimized.

In a spherical target design, the astigmatic power in the form of the spherical equivalent, calculated according to the equation $$\text{spherical equivalent} = \text{sphere} + 0.5 \times \text{cylinder}, \qquad \text{i)}$$

can be considered. As a result, a target design for a spectacle lens with a sphere value of +3 diopter and without astigmatic power is identical to a target design with a sphere value of +2 diopter and a cylinder value of +2 diopter or a target design for a spectacle lens for a sphere value of 0 diopter and a cylinder value of +6 diopter.

The outlay required to create the target design is relatively low using the method described in U.S. Pat. No. 6,382,789 B1 because the orientation of the axis in relation to a specified direction is not considered in the target design; however, the achievable aspherizations in the spectacle lenses to be generated, which differ along the two principal meridians depending on the size of the cylinder values, are not considered when using spherical target designs for optimizing a spectacle lens with astigmatic power. As a consequence, for instance, unachievable demands are placed on one principal meridian and unnecessary freedoms are left in another principal meridian within the scope of the optimization algorithm. In any case, the cylinder and axis values are not found in the target design, which hinders the full development of the possibilities of the optimization algorithm.

SUMMARY

It is an object of the present disclosure to make available a method for generating a target design, which allows a more complete development of the possibilities of the optimization algorithm. Additionally, it is an object of the present disclosure to make available a data processing system for generating a target design, which allows a more complete development of the possibilities of the optimization algorithm. Further objects of the present disclosure are that of making available a computer program and a storage medium which facilitate the performance of the method according to the disclosure. Additionally, it is an object of the disclosure to make available an advantageous method for providing a spectacle lens, a non-volatile computer-readable storage medium with an advantageous numerical representation of a spectacle lens and an advantageous method for producing a spectacle lens.

These objects are achieved by a computer-implemented method for generating a target design which considers an astigmatic power, a computer program for generating a target design which considers an astigmatic power, a data processing system for generating a target design which considers astigmatic power, a non-volatile computer-readable storage medium for generating a target design which considers astigmatic power, a method for generating a target design which considers astigmatic power, a non-volatile computer-readable storage medium for generating a target design which considers astigmatic power, and a method for generating a target design which considers astigmatic power as disclosed herein. Further, exemplary embodiments of the disclosure are described below.

According to the disclosure, a computer-implemented method for generating a target design which considers an astigmatic power and is suitable for use when optimizing a spectacle lens with astigmatic power is made available. The method comprises the step of providing an initial target design, which does not directly consider the astigmatic power. By way of example, the initial target design can be adapted for obtaining a certain spherical power or, should a target design be generated for a multifocal lens, a plurality of certain spherical powers in the spectacle lens to be generated.

The method according to the disclosure is distinguished in that the target design is generated by correcting the initial target design on the basis of a correction target design which directly considers the astigmatic power of the spectacle lens. Here, a target design should be considered as directly considering the astigmatic power if it considers the achievable aspherizations in the spectacle lens to be generated, which differ along the two principal meridians depending on the size of the cylinder values. Accordingly, a target design should be considered as not directly considering the astigmatic power if it does not consider the achievable aspherizations in the spectacle lens to be generated, which differ along the two principal meridians depending on the size of the cylinder values. By way of example, a spherical target design which is based on the spherical equivalent of the sphere and cylinder values from the prescription for the user does not consider the achievable aspherizations in the spectacle lens to be generated, which differ along the two principal meridians depending on the size of the cylinder values, and so it does not directly consider the astigmatic power. It should be noted that a spherical target design which includes neither the cylinder value nor the axis value from the prescription for the user, and consequently does not consider the astigmatic power at all, is also a target design which does not directly consider the astigmatic power. Therefore, within the scope of the present disclosure, "not directly considering" also includes the case of "not considering at all."

Therefore, the method according to the disclosure provides for the astigmatic power of a spectacle lens, as arises from the prescription, not to be directly considered in the target design but indirectly in the form of a correction that directly considers the astigmatic power for an initial target design which does not directly consider the astigmatic power. This procedure is advantageous in that the initial target design need not directly consider the astigmatic power (but can optionally indirectly consider this, for example in the form of the spherical equivalent). Instead, the initial target design can consider other parameters, the considering of which together with directly considering the astigmatic power would require great outlay. These parameters then need not be considered in the correction target design. If the target design to be generated is, e.g., a target design for use when optimizing a spectacle lens having a certain orientation during its use, the initial target design can consider data representing a specified direction, wherein the specified direction is necessitated by the orientation of the spectacle lens during its use. The correction target design is then created without considering the specified direction. The orientation of the spectacle lens and the specified direction in the target design necessitated thereby emerge in a multifocal lens such as, in particular, a progressive addition lens from the arrangement of the near portion relative to the distance portion, for example. Considering the use conditions of the spectacle lens also requires a specified direction in the target design. In the case of a single-vision lens, a specified direction in the target design may therefore be required as a result of considering use conditions. Within the scope of creating the target design for multifocal lenses or single-vision lenses, general use conditions are typically used in the process, i.e., use conditions which are matched to a defined group of wearers. Then, optimizing the spectacle lens with the aid of the created target design is typically implemented considering the individual use conditions of the user.

By way of the method according to the disclosure, in which the astigmatic power is only directly considered in the correction target design, the provision or ascertainment of a suitable initial target design and the provision or ascertainment of a suitable correction target design is possible with little outlay, particularly if, for example, a certain orientation of the spectacle lens necessitates a specified direction in the target design. The correction itself can likewise be performed with little outlay. The target design generated thus makes it possible to avoid unobtainable demands being placed in one principal meridian and unnecessary freedoms being left in another principal meridian within the scope of the optimization algorithm for optimizing a spectacle lens with astigmatic power, which would lead to the optimization algorithm being hindered in the complete development of its possibilities. By contrast, the complete development of the possibilities of the optimization algorithm is achievable with a target design generated in accordance with the method according to the disclosure. At the same time, the outlay for creating the target design remains manageable.

The correction target design directly considering the astigmatic power can be, in particular, a target design for a single-vision lens. Here, a target design for a single-vision lens should be understood to mean a target design which can be used for optimizing a single-vision lens. It is substantially easier to create a target design for a single-vision lens than a target design for a multifocal lens. A target design for a single-vision lens is nevertheless suitable for correcting the initial target design, even if the initial target design should be a multifocal lens. Here, in particular, the target design for a single-vision lens is a target design for an atoroidal single-vision lens. This facilitates a better correction of aberrations.

In particular, the correction target design can be based on the cylinder value from the prescription for the user. As a result, the value required when creating the correction target design can be taken directly from the prescription without conversions. When correcting the initial target design on the basis of the correction target design, it is then possible to use the axis value of the prescription for the user in order to set the orientation of the correction target design in relation to the initial target design. As a result, a dedicated correction target design is not required for each combination of cylinder and axis; instead, it is only required for each cylinder value, as a result of which there is a significant reduction in the number of correction target designs.

In one configuration of the method according to the disclosure, the provided initial target design is also based on a certain spherical initial value. This certain spherical initial value can be any sphere value, which keeps the outlay for the provision of the initial target design particularly low. However, it might also be specified by the spherical equivalent of the cylinder and axis values from the prescription for the user. Then, such an initial target design already has a certain adaptation to the astigmatic power of the spectacle lens to be produced, and so there is less correction than in the case where any random spherical initial value is used in the initial target design. Then, the correction design is formed on the basis of a target design based on the cylinder value from the prescription for the user and a target design based on the spherical initial value. Hence, the correction target design can be generated from two easy-to-form target designs. In particular, the correction target design can be formed from the difference between the target design based on the cylinder value from the prescription for the user and the target design based on the spherical initial value. Subtracting two target designs is a not very computationally intensive procedure. Here, the target design based on the spherical initial value and the target design based on the cylinder value from the prescription for the user respectively are, in particular, target designs for aspherical and atoroidal single-vision lenses, i.e., in each case a target design intended for the optimization of an aspherical or atoroidal single-vision lens. Such target designs have a simple structure and can therefore be formed and subtracted with especially little outlay.

The target design for a single-vision lens based on the cylinder value from the prescription for the user can be ascertained, in particular, on the basis of a number of target designs for single-vision lenses, which are each characterized by a combination of a sphere value and a cylinder value. This configuration renders it possible to calculate a number of target designs based on different cylinder and sphere values in advance and group these, for example in the form of a matrix. In a first specific configuration, which is accompanied by particularly little outlay for the ascertainment of the target design based on the cylinder value from the prescription for the user, the ascertainment of this target design is implemented by selecting a target design from a number of target designs for single-vision lenses, i.e., by selecting a target design from the aforementioned matrix. This procedure for ascertaining the target design based on the cylinder value from the prescription for the user works better with increased density of the arrangement of the number of target designs for single-vision lenses in the matrix, i.e., the procedure works better the smaller the differences between the sphere and cylinder values of single-vision lenses adjacent to one another in the matrix.

However, the ascertainment of the target design for a single-vision lens based on the cylinder value from the prescription for the user can also be implemented by interpolation between two target designs from the number of target designs for single-vision lenses, i.e., for example, by interpolating the cylinder values and interpolating the sphere values between at least two target designs, for example between target designs that are adjacent to one another in the matrix. This procedure also allows good results if the matrix with the single-vision lenses is not very dense, i.e., the differences between sphere values and between cylinder values is relatively large between target designs for single-vision lenses which are adjacent to one another in the matrix. However, even in the case of a relatively dense matrix, the use of an interpolation can lead to a target design which is adapted even better to the values according to the prescription and can consequently lead to a correction target design which is adapted even better to the prescription.

A computer program according to the disclosure for generating a target design which considers astigmatic power and is suitable for use when optimizing a lens with astigmatic power comprises instructions which, when executed on a computer, prompt the computer to provide an initial target design, which does not directly consider the astigmatic power. Moreover, the computer program according to the disclosure comprises instructions which, when executed on a computer, prompt the computer to generate the target design by correcting the initial target design on the basis of a correction target design which directly considers the astigmatic power of the spectacle lens. Consequently, the computer program according to the disclosure contains instructions which, when executed on a computer, cause the method according to the disclosure to be carried out. The developments described in relation to the method according to the disclosure and the advantages connected therewith can also be realized by the computer program according to the disclosure by way of corresponding instructions of the computer program.

A data processing system according to the disclosure for generating a target design which considers an astigmatic power and is suitable for use when optimizing a spectacle lens with astigmatic power, comprises a processor and a memory. The processor is configured to provide, on the basis of instructions of a computer program stored in the memory, an output target design which does not directly consider the astigmatic power. Moreover, the processor is configured to generate, on the basis of the instructions of the computer program stored in the memory, the target design by correcting the initial target design on the basis of a correction target design which directly considers the astigmatic power of the spectacle lens.

The computer-implemented method according to the disclosure can be carried out using the data processing system according to the disclosure. Developments of the data processing system according to the disclosure arise from the method according to the disclosure, which then is stored in the form of a computer program with corresponding instructions in the memory of the data processing system. Therefore, the advantages described in relation to the developments of the method according to the disclosure are transferable to corresponding developments of the data processing system according to the disclosure.

A non-volatile computer-readable storage medium according to the disclosure contains instructions for generating a target design which considers an astigmatic power and is suitable for use when optimizing a spectacle lens with astigmatic power. The instructions contained in the storage medium prompt a computer, when carried out on the latter, to provide an initial target design which does not directly consider the astigmatic power. Moreover, the storage medium comprises instructions stored thereon, which instructions, when executed on a computer, prompt the computer to generate the target design by correcting the initial target design on the basis of a correction target design which directly considers the astigmatic power of the spectacle lens.

The computer-readable storage medium according to the disclosure facilitates the provision of instructions which facilitate an execution of the computer-implemented method according to the disclosure, for a data processing system. Developments of the computer-readable storage medium according to the disclosure comprise instructions that represent developments of the method according to the disclosure. Advantages of the developments of the computer-readable storage medium according to the disclosure can therefore readily be derived from the advantages described with reference to the computer-implemented method according to the disclosure.

In the method according to the disclosure for providing a spectacle lens, an initial spectacle lens and a target design, which specifies at least one property to be achieved by the spectacle lens, are specified. An optimization algorithm is used to optimize at least one surface of the initial spectacle lens in such a way that the initial spectacle lens with the optimized surface obtains the at least one property to be achieved, as specified by the target design, to within an admissible deviation. Finally, the initial spectacle lens having the optimized surface is provided as the spectacle lens.

The method according to the disclosure for providing a spectacle lens is distinguished in that a target design generated according to the method according to the disclosure for generating a target design which considers an astigmatic power is specified as the target design. The advantages connected therewith arise directly from the advantages described with respect to the computer-implemented method for generating a target design which considers an astigmatic power.

By way of example, a property can be an astigmatic or spherical residual aberration. However, it is also possible for the property to be a surface astigmatism or a surface refractive power.

The at least one surface that is optimized can be the back surface or the front surface of the spectacle lens. However, it is also possible to optimize both the back surface and the front surface of the spectacle lens.

The at least one surface to be optimized of the initial spectacle lens can be a free-form surface. As such, they can be represented, for example, by the piecewise functions described at the outset.

For instance, the deviation can be specified by the function value of an error function, wherein the function value of the error function depends on the difference between the achieved property and the property to be achieved or, in the case of a plurality of properties, on the differences between the achieved properties and the respective properties to be achieved. By way of example, a deviation can be considered admissible if the function value of the error function does not exceed a specified threshold or if the function value of the error function has a minimum.

The provision of the spectacle lens can be implemented, in particular, by the provision of a numerical representation of the spectacle lens, wherein the numerical representation of the spectacle lens is then given by a numerical representation of the initial spectacle lens having the optimized surface. Moreover, according to the disclosure, a storage medium with such a numerical representation of a spectacle lens is made available.

Furthermore, according to the disclosure, a method for producing a spectacle lens is made available. In this method, an initial body is provided, from which the spectacle lens is produced by means of material-ablating processing, in particular by means of machining, on the basis of a numerical representation of the spectacle lens provided. In particular, the production can be implemented in computer-controlled fashion. The numerical representation of the spectacle lens is either read from a storage medium according to the disclosure that contains a numerical representation of a spectacle lens or provided by means of the method according to the disclosure for providing a spectacle lens. The advantages connected to the method according to the disclosure for producing a spectacle lens arise from the advantages of the method according to the disclosure for providing a spectacle lens and hence, as explained above, from the advantages described in relation to the computer-implemented method for producing a target design which considers an astigmatic power.

BRIEF DESCRIPTION OF THE DRAWINGS

The disclosure will now be described with reference to the drawings wherein.

DESCRIPTION OF EXEMPLARY EMBODIMENTS

Figure 1:
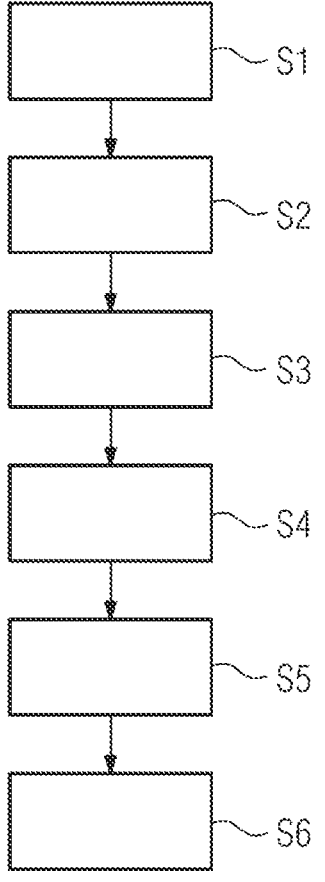
FIG. 1 shows a flowchart which represents an exemplary embodiment for the computer-implemented method for producing a target design.

The following definitions are used within the scope of the description of the disclosure:

Target design: A target design within the meaning of the present disclosure is the prescription of a distribution of image aberrations over the spectacle lens or of surface properties of the spectacle lens, which should be achieved in an optimization process. In the first case, reference is made to an optical target design and reference is made to a surface target design in the second case. Accordingly, an optical target design is the prescription of a distribution of image aberrations over the entire spectacle lens or else, therebeyond, in the spectacle wearer beam path (e.g., astigmatic residual deviation, spherical residual deviation, prism, horizontal symmetry, distortion, or else higher order aberrations such as, e.g., coma). Additionally, the optical target design may contain prescriptions for the astigmatic and spherical residual deviations at reference points (e.g., distance design reference point or near design reference point) or the addition power in the measurement beam path of a measuring device, e.g., in the beam path of a vertex power measuring device. By contrast, a surface target design specifies surface properties of the free-form surface to be formed that should be achieved in the optimization process, for example a surface refractive power and a surface astigmatism. Here, the surface refractive power is a measure for the ability of a surface section surrounding an optimization point to change the vergence (refractive index of the spectacle lens material divided by the radius of curvature of the wavefront) of a pencil of light incident on the surface section from the air. The surface astigmatism at an optimization point represents the difference of the surface refractive powers in the principal meridians at an optimization point of the surface. Provided the text below does not specifically refer to an optical target design or a surface target design but only to a target design, the term "target design" should always comprise both types of target design.

Initial target design: Within the scope of the disclosure, the term "initial target design" should be understood to mean a target design which is suitable for use when optimizing a spectacle lens and which forms a starting point, on the basis of which, finally, the target design to be generated is generated by means of a correction.

Specified direction: In a multifocal lens such as, e.g., a progressive addition lens, the orientation during its use is set by the arrangement of the near portion relative to the distance portion. The use conditions of a spectacle lens can also define a certain orientation of the spectacle lens during its use, and so an orientation of the spectacle lens during its use is also defined in a single-vision spectacle lens if use conditions are considered. The orientation of the spectacle lens is included in a target design for the optimization of such a spectacle lens, in the form of a specified direction which considers an orientation of the spectacle lens.

Correction target design: Within the scope of the disclosure, the term "correction target design" should be understood to mean a target design which is suitable for use when optimizing a spectacle lens and which is used to correct the initial target design.

Prescription: The term "prescription" denotes a summary in which the dioptric powers necessary for correcting a diagnosed refractive error are specified in the form of suitable values. In the case of spherical power, the prescription may contain a value "sph" for sphere. In the case of astigmatic power, the prescription can contain values "cyl" for cylinder and "axis" for axis, and, in the case of prismatic power, the prescription can contain a prism value. Moreover, the prescription may contain further values, for example the "add" value in the case of multifocal spectacle lenses, the "add" value specifying the difference between the vertex power in the near portion of the spectacle lens and in the distance portion of the spectacle lens. A value "PD" for the interpupillary distance may also be contained in the prescription.

Spherical initial value: Within the scope of the present disclosure, the term "spherical initial value" should be understood to mean a "sphere" value, which can be randomly selected and which, in particular, need not correspond to the "sphere" value from the prescription for the user of a spectacle lens. In an exemplary embodiment of the present disclosure, the spherical initial value is a value which corresponds to the spherical equivalent of the sphere and cylinder values from the prescription for the user. However, this is not mandatory.

Spherical equivalent: The term "spherical equivalent" denotes a mean spherical power of a spectacle lens with a spherical power and an astigmatic power, wherein the mean spherical power is based both on the spherical power and on the astigmatic power of the spectacle lens. The spherical equivalent is calculated according to the following equation:

$$\text{spherical equivalent}=\text{sphere}+0.5\times\text{cylinder}.$$

Use conditions: The term "use conditions" denotes the position and the orientation of the spectacles in relation to the eyes and the face of the wearer while the spectacles are worn. By way of example, the use conditions can be specified by the "as-worn" pantoscopic angle (DIN ISO 13666:2013-10, section 5.18), the face form angle (DIN ISO 13666:2013-10, section 17.3) and the vertex distance (DIN ISO 13666:2013-10, section 5.27) and are fitted to the respective wearer for each spectacle lens. Typical values for the "as-worn" pantoscopic angle lie between −20 degrees and +30 degrees; typical values for the vertex distance lie in the range between 20 mm and 30 mm; and typical values for the face form angle lie in the range between −5 degrees and +15 degrees. In addition to the "as-worn" pantoscopic angle, the face form angle and the vertex distance, the use conditions, as a rule, also include the interpupillary distance (DIN ISO 13666:2013-10, section 5.29), i.e., the distance between the centers of the pupils when the eyes are fixating an object at an infinite distance in the straight-ahead position, and the centration data, i.e., the dimensions and distances required to center the spectacle lens in front of the eye, and the object distance model, which sets the object distance for which a certain point on the spectacle lens surface is optimized. The use conditions can be individual use conditions, i.e., they are matched to a specific wearer, or general use conditions, i.e., they are matched to a defined group of wearers.

Principal meridian: A principal meridian (DIN ISO 13666:2013-10, section 7.4) is that meridian plane of a surface which shows the maximum or minimum curvature on measurement of the surface, with the term "meridian plane" (DIN ISO 13666:2013-10, section 5.7.1) denoting a plane containing the center(s) of curvature of a surface.

Interpolate: Within the scope of the present disclosure, the term "interpolate" should be understood to mean any way of ascertaining intermediate values between discrete values of a data record. By way of example, an interpolation can be implemented by virtue of a continuous or discontinuous function being fitted to the discrete values of the data record in such a way that the discrete values of the data record are each represented by function values, and function values lying between the function values representing the discrete values of the data record are then used as intermediate values.

Provision: Within the scope of the present disclosure, the term "provision" should be understood to mean any way of making data available; in particular, the term "provision" should comprise making available by reading from a memory or a network, making available by the reception of data, input into a computer, etc.

Aspherical lens: The term "aspherical lens" should be understood to mean a spectacle lens with an aspherical surface, wherein an aspherical surface is part of a surface of revolution having continuously variable curvature from the vertex to the periphery (DIN ISO 13666:2013-10, section 7.3). By contrast, a spherical surface is part of the inside or outside surface of a sphere (DIN ISO 13666:2013-10, section 7.1).

Atoroidal lens: The term "atoroidal lens" should be understood to mean a spectacle lens with an atoroidal surface, wherein in atoroidal surface is a surface having two mutually perpendicular principal meridians of unequal curvature, of which the cross section in at least one of the principal meridians is not circular (DIN ISO 13666:2013-10, section 7.6). By contrast, the cross section in both principal meridians is nominally circular in a toroidal surface (DIN ISO 13666:2013-10, section 7.5).

The method according to the disclosure for creating a target design is described below using the example of creating a target design for use in the optimization of a progressive addition lens which also comprises astigmatic power in addition to spherical power. Here, a progressive addition lens is a spectacle lens with at least one progressive surface that provides increasing (positive) addition power as the wearer looks down (DIN ISO 13666:2013-10, section 8.3.5), wherein, pursuant to DIN ISO 13666:2013-10, section 7.7, a progressive surface is a surface, which is non-rotationally symmetrical, with a continuous change of curvature over part or all of the surface, generally intended to provide increasing addition power. Pursuant to DIN ISO 13666:2013-10, the addition power is the difference between the vertex power of the near portion of the spectacle lens and the vertex power of the distance portion of the spectacle lens, measured with a specified method. In a prescription for a progressive addition lens, the addition power value is specified in the prescription in addition to the aforementioned values. Usually, the prescription moreover contains a value for the interpupillary distance.

For the purposes of explaining the disclosure, the assumption is made that the spherical power to be obtained by the progressive addition lens is specified in a prescription by a sphere value and an addition power value while the astigmatic power to be obtained is specified by cylinder and axis values. The progressive addition lens has a near portion and a distance portion, the arrangement of which relative to one another sets the orientation of the spectacle lens during its use and necessitates a specified direction in the target design. As a rule, the specified direction does not correspond to the direction provided by the axis of the astigmatic power, i.e., the direction provided by the axis value from the prescription for the user.

In order to be able to optimally fit a progressive addition lens to the user, general use conditions are also considered in the target design, i.e., use conditions which contain typical values for the "as-worn" pantoscopic angle, the face form angle and the vertex distance for a defined group of users. Therefore, in addition to the values contained in the prescription, general values for the face form angle, the vertex distance and the "as-worn" pantoscopic angle can also be included in the creation of a target design for use when optimizing a progressive addition lens. In the case of a single-vision lens, an orientation of the spectacle lens and hence a specified direction to be considered when creating the target design are set by considering use conditions.

The computer-implemented method, illustrated in FIG. 1 on the basis of a flowchart, starts with the values specified in the prescription for the user and data representing the specified direction being provided on the computer, on which the method is carried out and which represents a data processing system according to the disclosure. By way of example, this provision can be implemented by virtue of the values being entered into the computer by means of the human machine interface such as, for example, a keyboard, a touchscreen, a voice input unit, etc. or, provided the values are available electronically, the values being read from a memory into the computer via a suitable interface or being received by the computer via a network (step S1).

Then, in the present exemplary embodiment, in step S2, the spherical equivalent of the sphere and cylinder values are calculated on the basis of the sphere and cylinder values specified in the prescription. In the present exemplary embodiment, this spherical equivalent is used both in the provision of an initial target design and in the provision of a correction target design for correcting the target design. It should be noted here that the spherical equivalent need not necessarily be considered when providing the initial target design and the correction target design and can be replaced by a freely selectable certain spherical initial value, as will be explained further below. However, the use of the spherical equivalent as certain spherical initial value leads to the initial target design already having an adaptation to the astigmatic power of the spectacle lens.

Then, an initial target design is provided in step S3, which, in the present exemplary embodiment, considers the spherical equivalent calculated in step S2 and the data representing the specified direction. Moreover, in the present exemplary embodiment, the initial target design also considers the addition power value. Should the sought after target design be a target design for a single-vision lens rather than for a progressive addition lens, the addition power value is naturally not considered.

The initial target design represents a target design which is based on data representing the specified direction and which does not directly consider the astigmatic power. To the extent that the spherical equivalent, which includes the cylinder value, is considered in the initial target design, this only leads to a change in the spherical power represented by the initial target design, without the achievable aspherizations in the spectacle lens to be generated, which differ along the two principal meridians depending on the size of the cylinder values, being considered. The spherical power specified by the spherical equivalent merely represents a compromise, by means of which the differences along the principal meridians, which are perceivable by the user, are reduced. Consequently, the initial target design is a target design which does not directly consider the astigmatic power of the spectacle lens.

In the present exemplary embodiment, the initial target design is provided by selecting an initial target design from a set of target designs which, in the present exemplary embodiment, are characterized by sphere values and addition power values and by data representing the specified direction. The selection of the initial target design in view of the sphere value is implemented here, in the present exemplary embodiment, in such a way that a target design is selected with a sphere value which corresponds to the spherical equivalent calculated in step S2. The selection of the target design from the set of target designs can be implemented in automated fashion on the basis of the quantities specified in step S1, when using the spherical equivalent it can also be implemented using the automated calculation of the spherical equivalent in step S2.

It should be noted here that the initial target design of the present exemplary embodiment can be considered in terms of its power as a sum of, firstly, a target design considering the specified direction and, if available, the addition power and optional further parameters such as, for example, hard or soft design and, secondly, a target design for a single-vision lens considering the spherical equivalent.

So that the target design to be created can consider the astigmatic power specified in the prescription by a cylinder and axis, there is, within the scope of the method according to the disclosure, a correction of the initial target design provided in S3 with the aid of a correction target design, ascertained in step S4, which directly considers the astigmatic power of the spectacle lens. This correction target design does not consider the data representing the specified direction but only the cylinder value from the prescription for the user. In particular, the correction target design can be a target design which is intended for the optimization of a single-vision lens with the corresponding astigmatic power.

Figure 2:
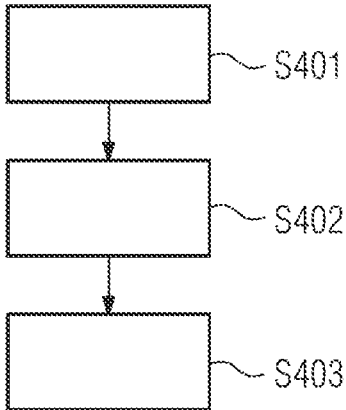
FIG. 2 shows a flowchart for a possible method for ascertaining a correction target design.

FIG. 2 shows a flowchart, on the basis of which the ascertainment of the correction target design is described below. To ascertain the correction target design, a first target design is automatically selected in step S401 from a matrix of target designs for atoroidal single-vision lenses, wherein each target design is characterized by a cylinder value and a sphere value. Here, in the present exemplary embodiment, a target design whose cylinder and sphere values are closest to the cylinder and sphere values from the prescription for the user is selected from the matrix of target designs. Alternatively, the first target design can be based on an interpolation between the cylinder and sphere values of at least those target designs of the matrix which have cylinder and sphere values adjacent to the cylinder and sphere values from the prescription for the user. The first target design ascertained in step 401 represents a target design for optimizing an atoroidal single-vision lens. This target design does not include any data considering the specified direction.

A second target design, which is a target design for optimizing an aspherical single-vision spectacle lens, is selected in step S402. This target design does not consider the data representing the specified direction either. It is therefore only characterized by a sphere value forming the basis for the aspherical single-vision lens. This second target design is ascertained by automatically selecting the target design from a set of target designs characterized by different sphere values, the selected target design coming closest with its sphere value to the spherical equivalent calculated in step S2. As in the case of ascertaining the first target design in step S401, the ascertainment of the second target design in step S402 can alternatively also be implemented by interpolation between target designs from the set of target designs.

After the first target design has been selected in step S401 and the second target design has been selected in step S402, the correction target design is calculated in step S403 on the basis of the selected target designs. Here, the calculation is implemented by virtue of the second target design selected in step S402 being subtracted from the first target design selected in step S401. Here, the values for the image aberration distribution or the surface property specified in the target designs are subtracted from one another at corresponding points of the target designs. In the case of vector quantities such as the astigmatic residual deviation, the directions of the quantities at the respective points are also taken into account during the subtraction, for example by forming vector differences. The correction target design calculated thus then represents the correction target design ascertained in step S4 of FIG. 1.

Then, the selected initial target design is corrected in step S5 on the basis of the ascertained correction target design. To this end, the initial target design and the correction target design are added in the present exemplary embodiment. Here, adding target designs means that the values for the distribution of image aberrations in the case of an optical target design are added together at the corresponding points of the initial target design and the correction target design. In the case of a surface target design, the values for a surface property at the corresponding points of the initial target design and the correction target design are added accordingly. In the case of vector quantities, the directions of the quantities at the respective points are also taken into account during the addition, for example by vector addition. Moreover, the axis value from the from the prescription for the user is taken into account during the addition by virtue of, prior to the addition, the orientation of the correction target design in relation to the initial target design being adapted to the axis specified in the prescription by the axis value.

Since, as explained above, the initial target design can be considered in terms of its effect as the sum of a target design considering the specified direction and, if present, the addition power and an aspherical target design, based on the spherical mean, for a single-vision lens, and the second target design subtracted from the first target design for forming the correction target design likewise is an aspherical target design, based on the spherical mean, for a single-vision lens, the contributions based on the spherical mean are canceled in the initial target design corrected by the correction target design. For this reason, any other spherical initial value can be used instead of the spherical mean, provided the same spherical initial value is used in the initial target design and in the correction target design.

The initial target design, corrected by the correction target design, is finally output in step S6 as the target design, created within the scope of the method, which considers the astigmatic power of the spectacle lens. Here, this output can be implemented by virtue of the target design being transmitted to an application or being stored on a storage medium.

The method steps described in relation to FIGS. 1 and 2 are typically carried out on a computer. Therefore, a computer program is present in order to be able to carry out the method, the computer program comprising instructions which, when the program is executed on the computer, prompt the latter to carry out the steps illustrated in FIGS. 1 and 2. The computer program can either be present on the computer or can be provided in a non-volatile computer-readable storage medium, to be loaded onto the computer. By way of example, such a non-volatile computer-readable storage medium can be a mobile or non-mobile hard disk drive, a mobile or non-mobile solid-state drive (SSD), a USB stick, or any other mobile or non-mobile storage medium. In the case of a non-mobile storage medium there is, for example, the option of accessing the storage medium via a network.

A data processing system 1 according to the disclosure, which is suitable for carrying out the method according to the disclosure, is described below with reference to FIG. 3. Such a data processing system 1 can be a computer with a computer program according to the disclosure running thereon. However, there is also the option of configuring the data processing system 1 as a dedicated apparatus, in which the method steps are fixedly implemented, for instance by means of application-specific integrated circuits (ASICs).

Figure 3:
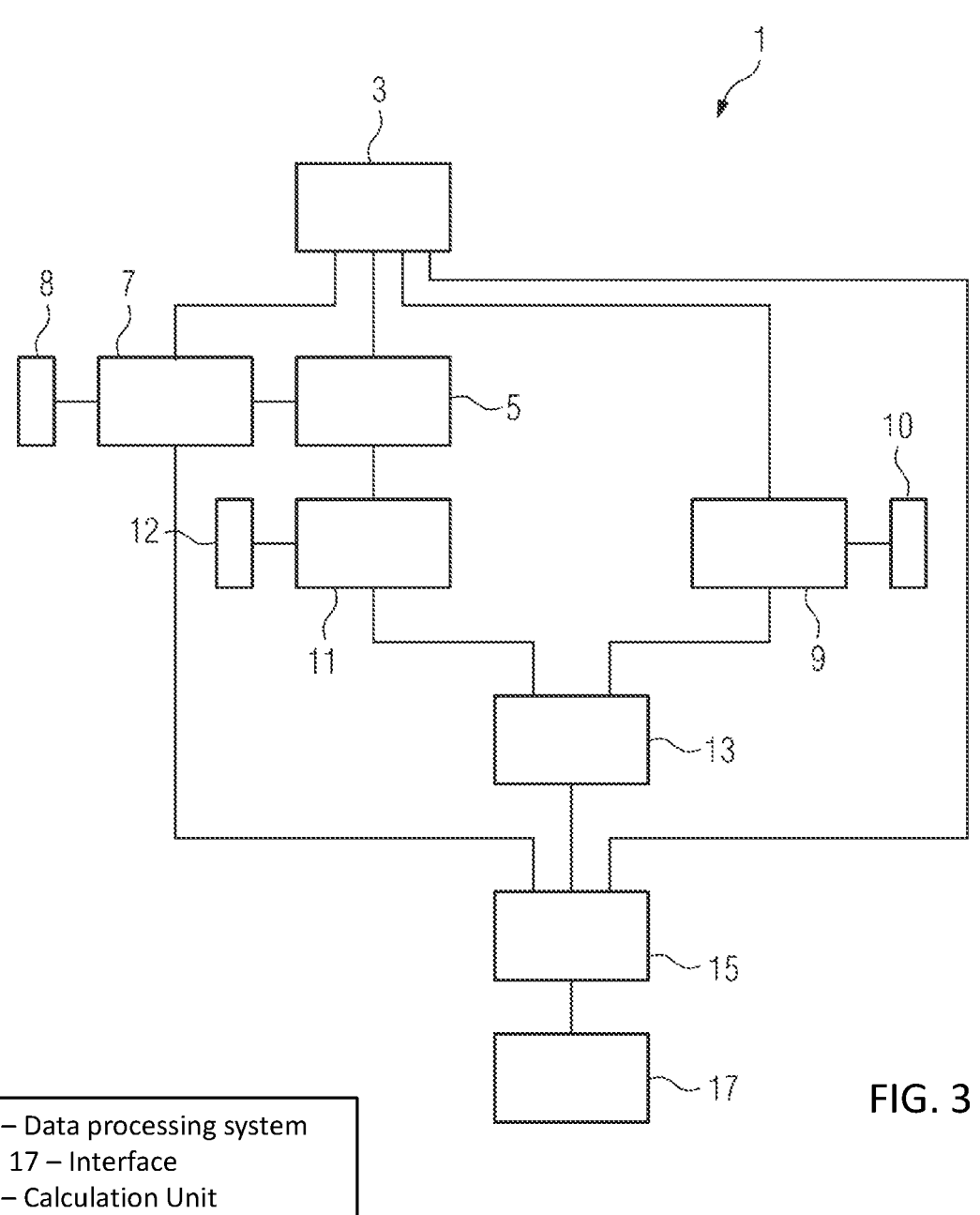
FIG. 3 schematically shows, in a block diagram, the components of a data processing system suitable for carrying out the method for producing a target design.

The data processing system 1 illustrated in FIG. 3 is designed, in particular, to carry out the method with all method steps described in FIGS. 1 and 2. It comprises an interface 3, by means of which the values contained in the prescription for the user and the data representing the specified direction can be entered or read into the data processing system 1 or by means of which the values contained in the prescription for the user and the data representing the specified direction can be received. Therefore, the interface 3 can either be a human machine interface or a data interface to a network or an external data medium.

The interface 3 is connected to calculation unit 5 which, on the basis of the sphere and cylinder values from the prescription for the user introduced into the data processing system 1 by the interface 3, calculates the spherical equivalent for these values.

The calculation unit 5 is connected to a first target design ascertainment unit 7, which moreover is also connected to the interface 3. On the basis of the value for the spherical equivalent received by the calculation unit 5 and on the basis of the data representing the specified direction, the calculation unit 5 selects an initial target design, which corresponds best to the spherical equivalent and the data representing the specified direction. The set of target designs from which the selection is made is stored in a memory 8. If the selected initial target design is based on the spherical equivalent, the latter already has a first adaptation to the astigmatic power according to the prescription. However, this adaptation is not mandatory. The selected initial target design can also be based on any other spherical initial value. This merely leads to a different correction target design than if the selected initial target design is based on the spherical equivalent.

The data processing system 1 contains two further target design ascertainment units, specifically a second target design ascertainment unit 9 and a third target design ascertainment unit 11. The second target design ascertainment unit 9 is connected to the interface 3 in order to obtain from the latter the value from the prescription for the user which relates to the cylinder. On the basis of the received value, the second target design ascertainment unit 9 then selects, in accordance with step S401, a target design for optimizing an atoroidal single-vision lens from a matrix stored in the memory 12. This selection is implemented as has been described in relation to step S401 in FIG. 2. The memory 12 can be identical to the memory 8 and/or to the memory 10. Rather than selecting the first target design, the second target design ascertainment unit 9 can also ascertain the first target design by an interpolation, as has been described with reference to FIG. 2.

The third target design ascertainment unit 11 is connected to the calculation unit 5 in order to obtain from the latter the calculated spherical equivalent. It is embodied to select the second target design provided in step S402. The set of target designs from which the selection is made is stored in a memory 10. This memory 10 contains a set of target designs for a spherical single-vision lenses. From the set of target designs, the third target design ascertainment unit 11 selects the target design which, in terms of its sphere value, comes closest to the calculated spherical equivalent. Alternatively, ascertaining the second target design by the third target design ascertainment unit 11 can also be implemented by an interpolation between target designs of the set of target designs, as has been described with reference to FIG. 2. If the initial target design contains a different spherical initial value than the spherical mean, this different spherical initial value is also used in the second target design instead of the spherical mean. In this case, the calculation unit 5 is replaced by a determination unit for determining the spherical initial value. The latter need not be connected to the interface 3 since a selection of the spherical initial value need not be based on the data contained in the prescription.

The second target design ascertainment unit 9 and the third target design ascertainment unit 11 are connected to a differentiating unit 13. The differentiating unit 13 receives the first target design from the selection unit 9 and the second target design from the selection unit 11 and subtracts the second target design from the first target design in order thus to generate the correction target design.

The first target design ascertainment unit 7 and the differentiating unit 13 are both connected to an adding unit 15, which receives the initial target design from the first target design ascertainment unit 7 and the correction target design from the differentiating unit 13. The adding unit 15 forms the sum of the initial target design and the correction target design in order thus to generate the desired target design. Finally, this target design is output at an output interface 17, from where it can be stored on a storage medium, input into a network or transmitted to a manufacturing machine, for example.

Together with an initial spectacle lens, the target design can be used to provide a spectacle lens. In the present exemplary embodiment, the spectacle lens is provided within the scope of a computer-implemented method, and so the initial spectacle lens is merely a numerical model defined by the parameters of the initial spectacle lens. The back surface of the initial spectacle lens, i.e., of the numerical model, is a free-form surface, which is described by a number of piecewise functions, as explained at the outset.

In the present exemplary embodiment, the target design describes at least a spherical residual aberration and an astigmatic residual aberration as properties, which should be obtained by the spectacle lens to within an admissible deviation. To this end, there is an optimization of the piecewise functions that describe the free-form surface. The optimization is carried out on the basis of an iterative optimization algorithm, in which, in each iteration step, the parameter values of the piecewise functions describing the free-form surface are altered and the currently obtained spherical residual aberration and the currently obtained astigmatic residual aberration are ascertained using the respective parameter values. The function value of an error function is ascertained on the basis of the currently obtained spherical residual aberration and the currently obtained astigmatic residual aberration. In the present exemplary embodiment, the error function is chosen such that its function value becomes smaller with decreasing difference between the currently achieved spherical residual aberration and the spherical residual aberration specified by the target design and decreasing difference between the currently obtained astigmatic residual aberration and the astigmatic residual aberration specified by the target design. Once these differences are so small that the function value of the error function no longer exceeds a specified threshold, the iterative optimization algorithm terminates in the present exemplary embodiment. The initial spectacle lens with the free-form surface provided by the parameters of the piecewise functions when the iterative optimization algorithm is terminated is provided as the optimized spectacle lens.

In the present exemplary embodiment, the provision is implemented by storing a numerical representation of the optimized spectacle lens on or in a non-volatile storage medium, from where it can be read or retrieved for further use. The provided numerical representation of the optimized spectacle lens can then be used to produce a physical spectacle lens. To this end, an initial body is provided, from which the spectacle lens is produced by means of computer-controlled machining or any other suitable material-ablating processing on the basis of the numerical representation of the spectacle lens provided.

Rather than carrying out the iterative method until the function value of the error function no longer exceeds a threshold, like in the present exemplary embodiment, the method can also be carried out until a minimum of the error function has been found. A minimum of the error function is distinguished in that the function value of the error function no longer becomes smaller when altering the parameters of the piecewise functions.

Even though the back surface of the spectacle lens has been optimized in the present exemplary embodiment, the front surface of the spectacle lens can, alternatively or additionally, be optimized. In this case, the front surface would, alternatively or additionally, be represented by piecewise functions and be optimized as described above.

Rather than specifying a spherical residual aberration and an astigmatic residual aberration like in the exemplary embodiment, the target design can, in alternative exemplary embodiments, specify a surface refractive power and a surface astigmatism. Then, the surface refractive power currently obtained with the respective parameter values and the surface astigmatism currently obtained with the respective parameter values are ascertained in the iteration steps of the optimization algorithm.

The present disclosure has been described in detail on the basis of specific exemplary embodiments for explanatory purposes. However, a person skilled in the art will appreciate that they may depart from the described exemplary embodiments. By way of example, the sequences of steps S3 and S4 and/or of steps 401 and S402 specified in the exemplary embodiment are not obligatory. Rather, the sequence can also be reversed or steps S3 and S4 and/or steps S401 and S402 can be carried out in parallel. Moreover, there is no need for the spherical equivalent from the sphere and cylinder values according to the prescription for the user to be included in the initial target design and the correction target design. Instead, any sphere value can be included in the initial target design and the correction target design. Therefore, a person skilled in the art recognizes that the claimed protection should only be restricted by the attached claims.

The foregoing description of the exemplary embodiments of the disclosure illustrates and describes the present invention. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-implemented method for generating a target design which considers an astigmatic power and is suitable for optimizing a spectacle lens with astigmatic power, the method comprising:

providing an initial target design which does not directly consider an astigmatic power of the spectacle lens or does not consider the astigmatic power of the spectacle lens at all; and correcting, with a processor, the initial target design based on a correction target design which directly considers the astigmatic power of the spectacle lens to generate the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

2. A computer-implemented method for generating a target design which considers an astigmatic power and is suitable for optimizing a spectacle lens with astigmatic power, the method comprising:

providing an initial target design which does not consider achievable aspherizations in the spectacle lens to be generated, which differ along two principal meridians depending on a size of a cylinder value; and correcting, with a processor, the initial target design based on a correction target design which considers the achievable aspherizations in the spectacle lens to be generated, which differ along the two principal meridians depending on the size of the cylinder value, to implement the generation of the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

3. The computer-implemented method as claimed in claim 1, wherein the target design to be generated is a target design for optimizing a spectacle lens having a predetermined orientation when mounted in a spectacle frame and the initial target design considers data representing a specified direction, wherein the specified direction is dependent on the predetermined orientation of the spectacle lens.

4. The computer-implemented method as claimed in claim 1, wherein the correction target design is a target design for a single-vision lens.

5. The computer-implemented method as claimed in claim 4, wherein the correction target design is a target design for an atoroidal single-vision lens.

6. The computer-implemented method as claimed in claim 1, wherein the correction target design is based on a sphere value and a cylinder value from a prescription for a user.

7. The computer-implemented method as claimed in claim 6, wherein an axis value from the prescription for the user is considered during the correction of the initial target design based on the correction target design to set an orientation of the correction target design in relation to the initial target design.

8. The computer-implemented method as claimed in claim 6, wherein the provided initial target design is based on an initial sphere value, and wherein the correction target design is corrected by a target design based on the initial sphere value from the prescription for the user and a target design based on the cylinder value.

9. The computer-implemented method as claimed in claim 8, wherein the correction target design is formed from a difference between the target design based on the initial sphere value from the prescription for the user and the target design based on the cylinder value for the user.

10. The computer-implemented method as claimed in claim 8, wherein the target design based on the initial sphere value and the target design based on the cylinder value from the prescription for the user are each target designs for single-vision lenses.

11. The computer-implemented method as claimed in claim 10, wherein the target design for a single-vision lens based on the cylinder value from the prescription for the user is ascertained based on a plurality of target designs for single-vision lenses, which each include a combination of the sphere value and the cylinder value.

12. The computer-implemented method as claimed in claim 11, wherein an ascertainment of the target design for a single-vision lens based on the cylinder value from the prescription for the user is implemented by selecting a target design from the plurality of target designs for single-vision lenses.

13. The computer-implemented method as claimed in claim 11, wherein an ascertainment of the target design for a single-vision lens based on the cylinder value from the prescription for the user is implemented by interpolating between two target designs from the plurality of target designs for single-vision lenses.

14. The computer-implemented method as claimed in claim 8, wherein the initial sphere value is given by a spherical equivalent of the sphere value and the cylinder value from the prescription for the user.

15. A computer-implemented method for generating a target design which considers an astigmatic power and is suitable for optimizing a spectacle lens with astigmatic power, the method comprising:

provide an initial target design which is a spherical target design; and implementing the generation of a target design by correcting, with a processor, the initial target design based on a correction target design which is a target design for an atoroidal single-vision lens, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

16. The computer-implemented method as claimed in claim 15, wherein the correction target design is based on a spherical equivalent of a sphere value and a cylinder value from a prescription for a user.

17. A non-transitory computer-readable storage medium with instructions stored thereon for generating a target design which considers astigmatic power and is suitable for optimizing a spectacle lens with astigmatic power, wherein the instructions, when executed on a computer, prompt the computer to:

provide an initial target design which does not directly consider an astigmatic power of the spectacle lens or does not consider the astigmatic power of the spectacle lens at all; and correct, with a processor, the initial target design based on a correction target design which directly considers the astigmatic power of the spectacle lens to generate the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

18. A non-transitory computer-readable storage medium with instructions stored thereon for generating a target design which considers astigmatic power and is suitable for optimizing a spectacle lens with astigmatic power, wherein the instructions, when executed on a computer, prompt the computer to:

provide an initial target design which does not consider achievable aspherizations in the spectacle lens to be generated, which differ along two principal meridians depending on a size of a cylinder value; and correct, with a processor, the initial target design based on a correction target design which considers the achievable aspherizations in the spectacle lens to be generated, which differ along the two principal meridians depending on the size of the cylinder value, to implement the generation of the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

19. A non-transitory computer-readable storage medium with instructions stored thereon for generating a target design which considers astigmatic power and is suitable for optimizing a spectacle lens with astigmatic power, wherein the instructions, when executed on a computer, prompt the computer to:

provide an initial target design which is a spherical target design; and implement the generation of a target design by correcting, with a processor, the initial target design based on a correction target design which is a target design for an atoroidal single-vision lens, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

20. A data processing system for generating a target design which considers astigmatic power and is suitable for optimizing a spectacle lens with astigmatic power, wherein the data processing system comprises:

a processor; and at least one non-transitory storage memory, wherein the processor is configured, based on instructions of a computer program stored in the at least one non-transitory storage memory, to:

provide an initial target design which does not directly consider an astigmatic power of the spectacle lens or does not consider the astigmatic power of the spectacle lens at all; and correct, with a processor, the initial target design based on a correction target design which directly considers the astigmatic power of the spectacle lens to generate the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

21. A data processing system for generating a target design which considers astigmatic power and is suitable for optimizing a spectacle lens with astigmatic power, wherein the data processing system comprises:

a processor; and at least one non-transitory storage memory, wherein the processor is configured, based on instructions of a computer program stored in the at least one non-transitory storage memory, to:

provide an initial target design which does not consider achievable aspherizations in the spectacle lens to be generated, which differ along two principal meridians depending on a size of a cylinder value; and correct, with the processor, the initial target design based on a correction target design which considers the achievable aspherizations in the spectacle lens to be generated, which differ along the two principal meridians depending on the size of the cylinder value, to implement the generation of the target design, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

22. A data processing system for generating a target design which considers astigmatic power and is suitable for optimizing a spectacle lens with astigmatic power, wherein the data processing system comprises:

a processor; and at least one non-transitory storage memory, wherein the processor is configured, based on instructions of a computer program stored in the at least one non-transitory storage memory, to:

provide an initial target design which is a spherical target design; and implement the generation of a target design by correcting, with the processor, the initial target design based on a correction target design which is a target design for an atoroidal single-vision lens, wherein the correction target design is calculated by subtracting a first target design from a second target design, wherein correcting the initial target design includes adding the initial target design and the correction target design, and wherein the initial target design is based on a spherical initial value and the correction target design is based on a cylinder value of a prescription.

23. A method for providing a spectacle lens, the method comprising:

specifying an initial spectacle lens and a target design, which specifies at least one property to be achieved by the spectacle lens;

optimizing at least one surface of the initial spectacle lens with an optimization algorithm such that the initial spectacle lens with the optimized surface obtains the at least one property to be achieved, as specified by the target design, to within an admissible deviation; and providing the initial spectacle lens having the optimized surface as the spectacle lens, wherein the target design generated as claimed in claim 1 is specified as the target design.

24. The method as claimed in claim 23, further comprising:

implementing the provision of the spectacle lens by providing a numerical representation of the spectacle lens, wherein the numerical representation of the spectacle lens is given by a numerical representation of the initial spectacle lens having the optimized surface.

25. A non-transitory computer-readable storage medium with a numerical representation of a spectacle lens, wherein the storage medium contains a numerical representation of the spectacle lens, which has been provided according to the method as claimed in claim 24.

26. A method for producing a spectacle lens, wherein an initial body is provided from which the spectacle lens is produced on the basis of a provided numerical representation of the spectacle lens by material-ablating processing, wherein the numerical representation of the spectacle lens is read from a storage medium as claimed in claim 25.

27. A computer-implemented method for generating a target design which considers an astigmatic power and is suitable for optimizing a spectacle lens with astigmatic power, the method comprising:

calculating a spherical equivalent of a sphere value and a cylinder value from a prescription for a user;

providing a set of target designs, each target design from the set of target designs having a sphere value, a specified direction, and, optionally, data representing an addition power;

selecting an initial target design from the set of target designs, wherein the initial target design does not directly consider the astigmatic power of the spectacle lens, and wherein the sphere value of the initial target design corresponds to the calculated spherical equivalent; and generating the target design by correcting the initial target design based on a correction target design which directly considers the astigmatic power of the spectacle lens, wherein the correction target design directly considering the astigmatic power of the spectacle lens is ascertained by:

selecting, from a matrix of target designs for atoroidal single-vision lenses, a first target design whose sphere value and cylinder value are closest to the sphere value and the cylinder value from the prescription for the user;

selecting a second target design, which is a target design for optimizing an aspherical single-vision lens and which is formed by a sphere value based on an aspherical single-vision lens, from a set of second target designs having different sphere values, wherein the sphere value of the selected second target design comes closest to the calculated spherical equivalent; and calculating the correction target design by subtracting the selected second target design from the selected first target design, wherein correcting the initial target design includes adding the initial target design and the correction target design, and wherein the initial target design is based on a spherical initial value and the correction target design is based on a cylinder value of a prescription.

* * * * *